(12) United States Patent
Seo et al.

(10) Patent No.: US 8,750,912 B2
(45) Date of Patent: Jun. 10, 2014

(54) METHOD OF ALLOCATING UPLINK RESOURCES IN WIRELESS COMMUNICATION SYSTEM

(75) Inventors: Han Byul Seo, Gyeongki-do (KR); Seon Wook Kim, Seoul (KR); Seo Shin Kwack, Gwacheon-si (KR); Min Soo Na, Seoul (KR); Byoung Hoon Kim, Gyeongki-do (KR); Sung Hyun Choi, Seoul (KR)

(73) Assignees: LG Electronics Inc., Seoul (KR); SNU R&DB Foundation, Seoul (KR)

( * ) Notice: Subject to any disclaimer, the term of this patent is extended or adjusted under 35 U.S.C. 154(b) by 591 days.

(21) Appl. No.: 13/000,760

(22) PCT Filed: Aug. 18, 2009

(86) PCT No.: PCT/KR2009/004602
§ 371 (c)(1),
(2), (4) Date: Dec. 22, 2010

(87) PCT Pub. No.: WO2010/024550
PCT Pub. Date: Mar. 4, 2010

(65) Prior Publication Data
US 2011/0111784 A1 May 12, 2011

(30) Foreign Application Priority Data
Aug. 29, 2008 (KR) ........................ 10-2008-0084846

(51) Int. Cl.
*H04B 7/00* (2006.01)

(52) U.S. Cl.
USPC ........... 455/509; 455/500; 455/517; 455/515; 455/511; 455/450; 370/328; 370/329; 370/330; 370/331; 370/343

(58) Field of Classification Search
USPC ................. 455/509, 500, 517, 515, 511, 513, 455/67.11, 514, 445, 550.1, 403, 422.1, 455/414.1–414.4, 450; 370/310, 328, 329, 370/330, 331, 343
See application file for complete search history.

(56) References Cited

U.S. PATENT DOCUMENTS

| | | | |
|---|---|---|---|
| 2005/0068884 A1 | 3/2005 | Yoon et al. | |
| 2005/0111429 A1 | 5/2005 | Kim et al. | |
| 2008/0165733 A1* | 7/2008 | Xiao et al. | 370/330 |
| 2009/0109907 A1* | 4/2009 | Tsai et al. | 370/329 |
| 2009/0323602 A1* | 12/2009 | Li et al. | 370/329 |
| 2012/0147821 A1* | 6/2012 | Bertrand et al. | 370/328 |
| 2013/0016701 A1* | 1/2013 | Malladi et al. | 370/331 |

FOREIGN PATENT DOCUMENTS

| | | |
|---|---|---|
| KR | 10-2005-0027563 | 3/2005 |
| KR | 10-2005-0029082 | 3/2005 |

* cited by examiner

*Primary Examiner* — Keith Ferguson
(74) *Attorney, Agent, or Firm* — Morgan, Lewis & Bockius LLP

(57) ABSTRACT

A method of allocating uplink resources in a wireless communication system is provided. The method comprises generating a first message which has a preamble and adaptively further includes resource request information based on a communication state with a base station and transmitting the first message to the base station.

12 Claims, 6 Drawing Sheets

METHOD OF ALLOCATING UPLINK RESOURCES IN WIRELESS COMMUNICATION SYSTEM

TECHNICAL FIELD

The present invention relates to wireless communication, and more particularly, to a method of allocating uplink resources in a wireless communication system.

BACKGROUND ART

3GPP (3rd Generation Partnership Project) mobile communication systems based on WCDMA (Wideband Code Division Multiple Access) radio access technology are widely developed worldwide. HSDPA (High Speed Downlink Packet Access) which can be defined as the first evolution step of WCDMA provides a wireless access technique having high competitiveness in mid-term future to 3GPP. However, new technology evolution in 3GPP is required in order to continuously maintain competitiveness because requirements and expectations of users and wireless operators continuously increase and competing radio access techniques are continuously developed. The requirements include a reduction in the cost per bit, service availability increase, flexible use of frequency bands, simple structures and open interfaces, appropriate power consumption of terminals, etc.

One of systems, which is considered as a system following third-generation systems, is an OFDM (Orthogonal Frequency Division Multiplexing) system which can attenuate inter-symbol interference with low complexity. OFDM transforms serial input data symbols into N parallel data symbols, respectively loads the N parallel data symbols on N subcarriers and transmit the N subcarriers. Subcarriers maintain orthogonality in the frequency dimension. Each orthogonal channel undergoes independent frequency selective fading and the intervals between transmitted symbols become long, and thus inter-symbol interference can be minimized.

Furthermore, IEEE (Institute of Electrical and Electronics Engineers) 802.16 standard provides techniques and protocols for supporting broadband wireless access. Standardization was performed since 1999 and IEEE 802.16-2001 was approved in 2001. The IEEE 802.16 standard is based on a single carrier physical layer referred to as 'WirelessMAN-SC'. Then, 'WirelessMAN-OFDM' and 'WirelessMAN-OFDMA' were added to the physical layer including 'WirelessMAN-SC' in IEEE 802.16a standard approved in 2003. IEEE 802.16-2004 standard revised after IEEE 802.16a standard was approved in 2004. IEEE 802.16-2004/Cor1 (referred to as IEEE 802.16e) in the form of 'corrigendum' was completed in 2005 in order to correct bug and error of IEEE 802.16-2004.

Recently, multiple-antenna systems have received attention for maximizing the performance and communication capacity of wireless communication systems. The multiple-antenna systems may include MIMO (Multiple Input Multiple Output) system, MISO (Multiple Input Single Output) system and SIMO (Single Input Multiple Output) system. Multiple-antenna techniques can improve transmitted/received data transmission efficiency by adopting multiple transmission antennas and/or multiple receiving antennas instead of a single transmission antenna and a single receiving antenna.

DISCLOSURE OF INVENTION

Technical Problem

Hereinafter, downlink means communication from a base station (BS) to a user equipment (UE) and uplink means communication from a UE to a BS. Generally, a BS in a wireless communication system schedules uplink and downlink resources. A UE can attempt random access in order to request a BS to provide uplink resources. Random access used in the specification is terminology arbitrarily defined to represent the technical spirit of the present invention and can be changed to various terms that can be recognized by those skilled in the art according to technical contents. For example, random access can be replaced by arbitrary access or ranging but it is not limited thereto.

IEEE 802.16e standard presents an uplink resource request method using ranging.

FIG. 1 illustrates an example of an uplink resource allocation method using ranging.

Referring to FIG. 1, a UE arbitrarily selects a single ranging code from a ranging code set including a plurality of ranging codes and transmits a first message including the selected ranging code to a base station (BS) (step S100). The BS receives the first message, detects the ranging code and transmits a second message including resource allocation information for resource request information to the UE (step S110). The UE receives the second message and transmits a third message including the resource request information by using the resource allocation information to the BS (step S120). The BS receives the third message and transmits a fourth message including resource allocation information for data to the UE (step S130). The UE receives the fourth message and transmits the data to the BS by using the resource allocation information.

According to the method illustrated in FIG. 1, however, the UE can transmit the data to the BS after transmitting/receiving operations of the 1st to 4th messages between the BS and UE. Accordingly, delay occurs when the UE has data for transmitting to the BS. Furthermore, ranging channel capacity does not increase even when the BS uses multiple antennas. Accordingly, when multiple UEs select the same ranging code and transmit the first messages, the BS transmits the second messages including the same resource allocation information to the multiple UEs. This brings about a collision between third messages transmitted from the multiple UEs to result in time delay.

FIG. 2 illustrates an example of an uplink resource allocation method using random access.

Referring to FIG. 2, a UE transmits a first message including preamble and additional information to a BS (step S200). Here, the additional information includes a traffic class, quality of service (QoS), priority, etc. The BS receives the first message and confirms whether the first message includes the additional information (step S210). The BS generates a second message based on whether the first message includes the additional information (step S220). The BS allocates resources based on the additional information when the first message includes the additional information. The BS generates the second message to allocate resources for transmitting resource request information when the first message does not include the additional information. The BS transmits the second message to the UE (step S230). The UE receives the second message and transmits a third message including data or the resource request information to the BS (step S240). The BS receives the third message and transmits a fourth message including resource allocation information for data transmission to the UE (step S250). The UE receives the fourth message and transmits data by using the resource allocation information included in the fourth message.

According to the method illustrated in FIG. 2, the UE can transmit the data through the resources allocated based on the second message from the BS when the first message includes the additional information.

However, the additional information does not include detailed information such as the address of UE for data transmission or the exact quantity of required resources. Accordingly, an uplink resource request operation is needed in order to complete data transmission although the UE can transmit some of the data to the BS through the resources allocated based on the second message. Consequently, substantial delay required for data transmission cannot be reduced even by the method illustrated in FIG. 2.

Furthermore, there is no method capable of detecting whether error with respect to the additional information of the first message is generated. Accordingly, if error is generated in the additional information when the UE attempts random access, the BS may not allocate the exact quantity of resources required by the UE.

Moreover, when the BS uses multiple antennas, the BS may receive multiple first messages including the same preamble from multiple UEs. Here, the BS transmits the second message including the same resource allocation information to the multiple UEs and a collision between third messages transmitted from the multiple UEs cannot be solved.

It is an object of the present invention to decrease a time delay in an uplink resource allocation operation of a wireless communication system.

It is another object of the present invention to provide a method of efficiently allocating uplink resources in consideration of a channel state in a wireless communication system.

Solution to Problem

According to an aspect of the present invention, a method of allocating uplink resources in a wireless communication system comprise generating a first message which has a preamble and adaptively further includes resource request information based on a communication state with a base station and transmitting the first message to the base station.

The communication state may be determined in consideration of at least one of information on a channel quality between the base station and a user equipment transmitting the first message, information on a position, information on a strength of a downlink received signal and information on the number of transmission failure of the first message.

The resource request information may include a MAC (Medium Access Control) address of the user equipment transmitting the first message and information on the quantity of requested resources.

The resource request information may further include an error check code.

The method may further comprise receiving a second message which includes resource allocation information for data transmission when the first message includes both the preamble and the resource request information and includes resource allocation information for transmitting the resource request information when the first message includes only the preamble.

The method may further comprise transmitting a third message which includes data when the second message includes the resource allocation information for data transmission and includes resource request information when the second message includes the resource allocation information for transmitting the resource request information.

The resource request information may be spread with a spreading code and transmitted when the first message includes the resource request information.

The spreading code may be determined according to the preamble included in the first message.

According to another aspect of the present invention, a user equipment comprises a processor and a RF (Radio Frequency) unit which is connected to the processor and transmits/receives a radio signal, wherein the processor is configured to generate a first message which has a preamble and adaptively further includes resource request information based on a communication state with a base station and transmit the first message to the base station.

According to another aspect of the present invention, a method of allocating uplink resources in a wireless communication system comprises receiving a first message including a preamble and resource request information from a user equipment, detecting the first message and adaptively generating a second message based on whether the resource request information is detected from the first message and transmitting the second message to the user equipment, wherein the resource request information includes a MAC address of the user equipment and a quantity of requested resources.

The resource request information may further include an error check code.

The second message may include resource allocation information for data transmission when the resource request information is detected from the first message and includes resource allocation information for transmitting the resource request information when the resource request information is not detected from the first message.

The second message may include a first message re-transmission request when the same preamble is detected from a plurality of first messages received from a plurality of user equipments.

The second message may further include information on the first message detection result The information on the first message detection result may be represented by one of a flag bit indicating that only the preamble is detected from the first message, a flag bit indicating that the preamble and the resource request information are detected from the first message and a flag bit indicating that the same preamble is detected from the plurality of first messages received from the plurality of user equipments.

The method may further comprise receiving a third message which includes data when the second message includes the resource allocation information for data transmission and includes the resource request information when the second message includes the resource allocation information for transmitting the resource request information.

According to another aspect of the present invention, a method of allocating uplink resources of a base station using multiple antennas in a wireless communication system comprises receiving a plurality of first messages including preambles and resource request information from a plurality of user equipments, estimating channel states between the plurality of user equipments and the base station by using the plurality of first messages, detecting the resource request information by using the estimated channel states and a multi-user detector, generating a plurality of second messages respectively including resource allocation information for data transmission for the plurality of user equipments based on the detected resource request information and respectively transmitting the second messages to the plurality of user equipments.

The multi-user detector may use one of a matched filter, zero forcing, minimum mean squared error and successive interference cancellation.

According to another aspect of the present invention, a method of allocating uplink resources of a base station in a wireless communication system comprises setting first message guide information and transmitting the first message guide information to a user equipment and receiving a first message generated based on the first message guide information, wherein the first message guide information is set such that the first message has a preamble and adaptively further includes resource request information based on a communication state between the base station and the user equipment.

The communication state may be determined in consideration of at least one of information on the number of receiving antennas of the base station and information on uplink load.

The first message guide information may set the time or frequency at which the first message is transmitted based on whether the first message includes the resource request information.

The first message guide information may set the first message such that the preamble included in the first message is selected from different preamble sets based on whether the first message includes the resource request information.

Advantageous Effects of Invention

According to the present invention, time required for a resource allocation operation for transmitting data through uplink can be reduced and uplink resource allocation can be efficiently performed in consideration of a channel state between a UE and a BS. Furthermore, when the BS corresponds to a multi-antenna system, channel capacity increases.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Figure 1:
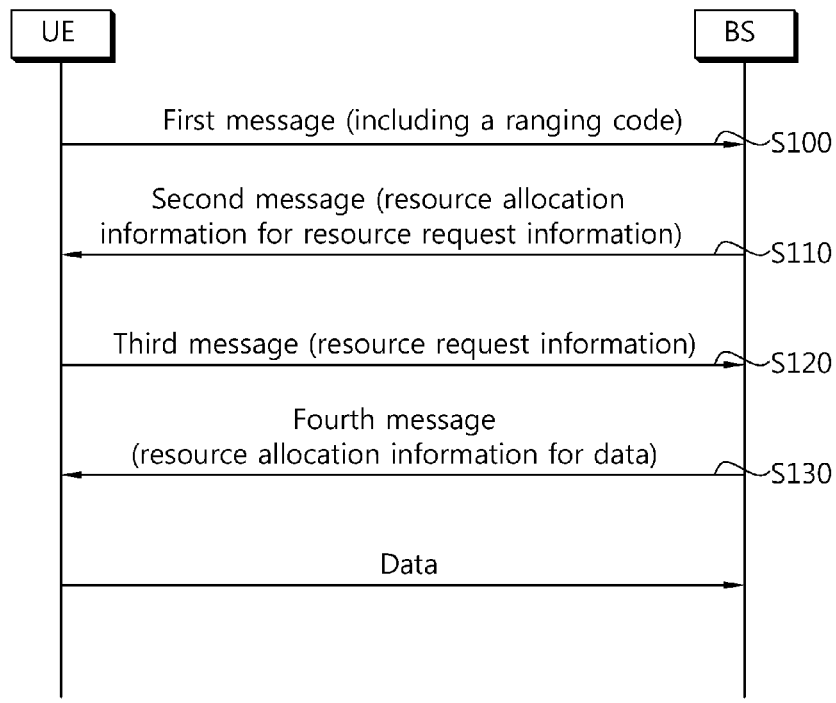
FIG. 1 illustrates an example of an uplink resource request method using ranging.
Figure 2:
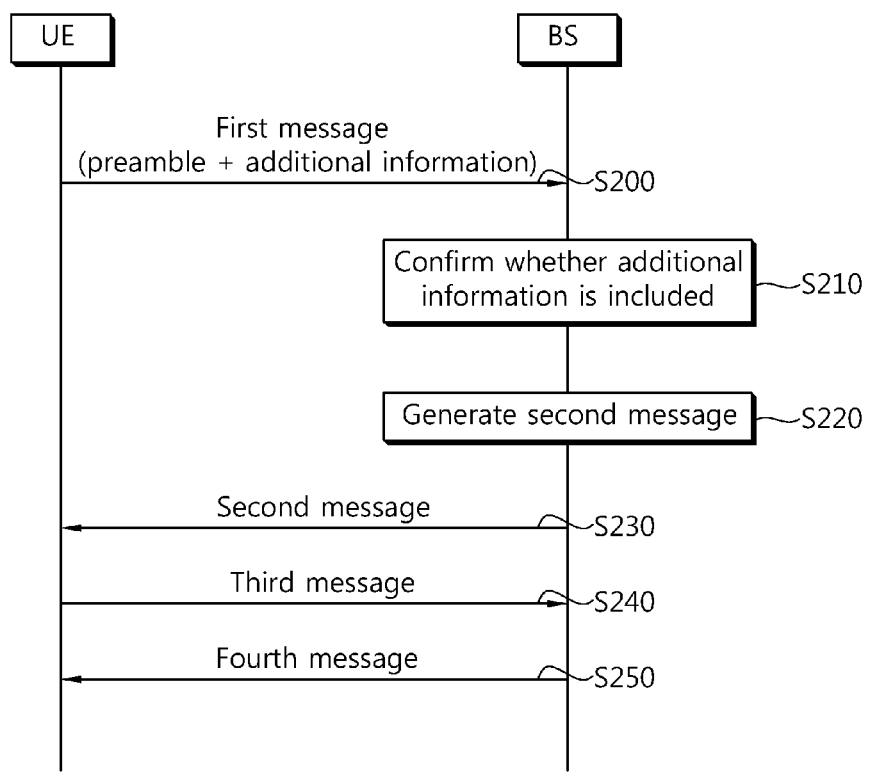
FIG. 2 illustrates an example of an uplink resource request method using random access.
Figure 3:
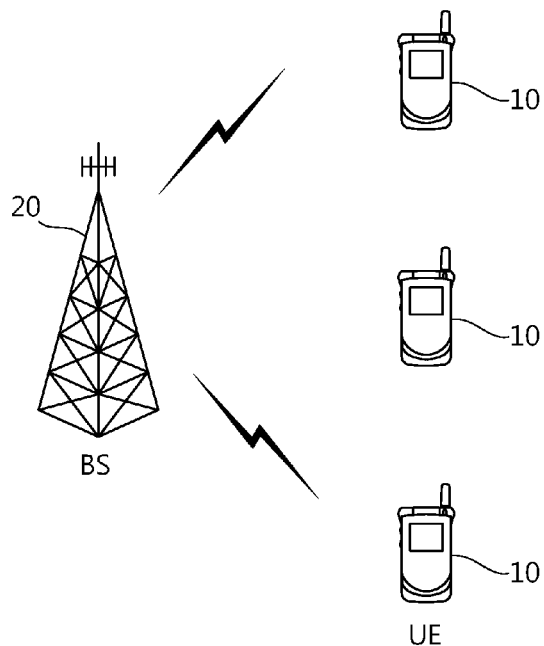
FIG. 3 illustrates a configuration of a wireless communication system.

FIG. 3 illustrates a configuration of a wireless communication system. The wireless communication system provides various communication services such as audio and packet data.

Referring to FIG. 3, the wireless communication system includes UEs 10 and a BS 20. The UEs 10 may be fixed or movable and referred to as other terminology such as a mobile station (MS), a user terminal (UT), a subscriber station (SS), a wireless device, etc. The BS 20 corresponds to a fixed station communicating with the UEs 10 and may be referred to as other terminology such as a node-B, a base transceiver system (BTS), an access point (AP), etc. A single BS may include at least one cell.

Hereinafter, downlink means transmission from the BS 20 to the UEs 10 and uplink means transmission from the UEs 10 to the BS 20. A transmitter may be a part of the BS 20 and a receiver may be a part of the UE 10 in downlink. The transmitter may be a part of the UE 10 and the receiver may be a part of the BS 20 in uplink.

Multiple access techniques applied to the wireless communication system are not limited. A variety of multiple access techniques such as CDMA (Code Division Multiple Access), TDMA (Time Division Multiple Access), FDMA (Frequency Division Multiple Access), SC-FDMA (Single-Carrier FDMA) and OFDMA (Orthogonal Frequency Division Multiple Access) can be used.

Figure 4:
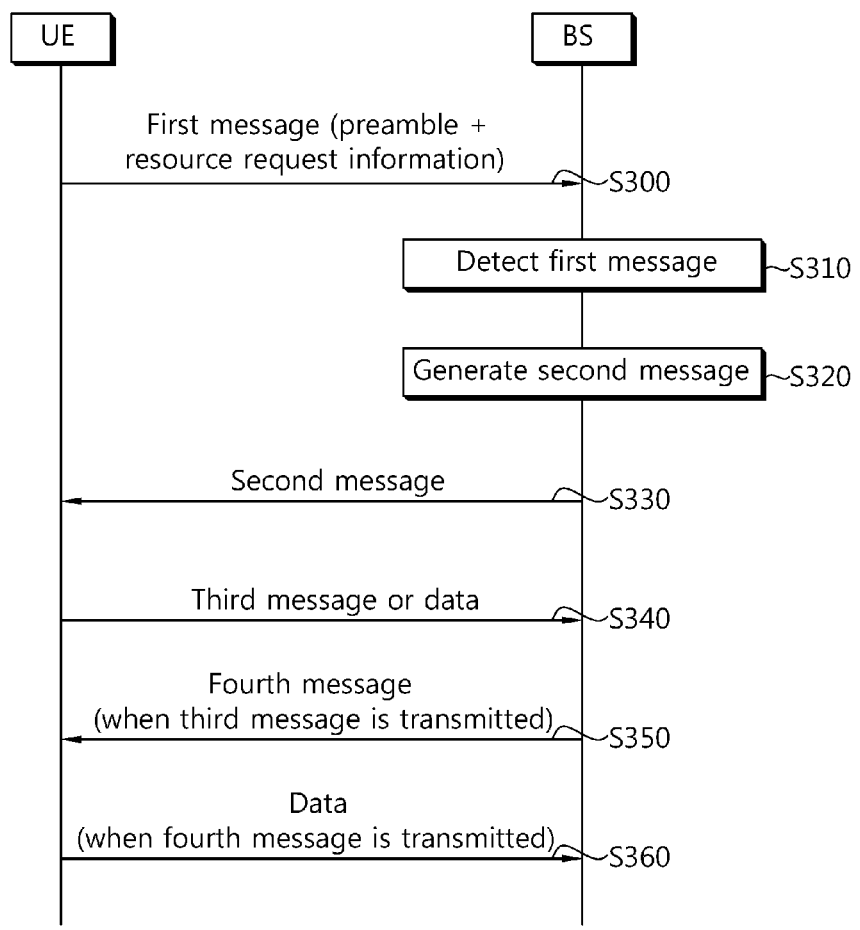
FIG. 4 is a flowchart illustrating an uplink resource allocation method according to an embodiment of the present invention.

FIG. 4 is a flowchart illustrating an uplink resource allocation method according to an embodiment of the present invention.

Referring to FIG. 4, a UE transmits a first message including a preamble and resource request information to a BS (step S300). The resource request information may include MAC (Medium Access Control) address information of the UE, information on the quantity of requested resources and an error check code such as head checksum. Here, the information on the quantity of requested resources corresponds to information on the quantity of resources required for data transmission.

The BS receives the first message and detects the first message (step S310). The BS can detect both the preamble and the resource request information or only the preamble from the first message. The BS detects only the preamble when two or more UEs simultaneously transmit first messages using different preambles or the BS does not detect the resource request information due to a poor channel receiving environment.

The BS generates a second message based on the contents detected from the first message (step S320). Specifically, the BS generates the second message including resource allocation information (referred to as first resource allocation information) for data transmission when the BS detects both the preamble and the resource request information from the first message. The BS generates the second message including resource allocation information (referred to as second resource allocation information) for transmitting resource request information when the BS detects only the preamble from the first message.

The BS transmits the second message to the UE (step S330).

The UE receives the second message and transmits a third message to the BS (step S340). When the second message includes the first resource allocation information, the third message includes data to be transmitted from the UE to the BS. Accordingly, data transmission is completed. However, when the second message includes the second resource allocation information, the third message includes resource request information.

The BS receives the third message including the resource request information and transmits a fourth message to the UE (step S350). Here, the fourth message includes the first resource allocation information corresponding to the resource allocation information for data transmission.

The UE receives the fourth message and transmits data to the BS to thereby complete data transmission (step S360).

The BS may request the UE to re-transmit the first message when the BS determines that multiple UEs are simultaneously connected to the BS using the same preamble, which is not illustrated in FIG. 4. Here, the BS can determine whether the multiple UEs simultaneously are connected thereto by determining whether resource request information is not detected although the same preamble is detected from multiple first messages received from the multiple UEs and by using the strength of the received preamble signal. When the BS determines that the multiple UEs are simultaneously connected thereto, the BS can generate the second message which includes a message that requests retransmission of the first message. Furthermore, the BS can request the UE to re-transmit the first message by transmitting no second message corresponding to a response to detection of the preamble. That is, the UE can re-transmit the first message when the UE does not receive the second message within a predetermined time.

In addition, the BS can notify the UE of one of the case in which the BS detects only the preamble, the case in which the BS detects both the preamble and the resource request information and the case in which the BS determines that the multiple UEs are simultaneously connected thereto using the same preamble. For example, the BS may use flag bits for informing the UE of the aforementioned three cases. That is, the BS can use one of a flag bit representing that the BS detects only the preamble, a flag bit representing that the BS detects both the preamble and the resource request information and a flag bit representing that the BS determines that the multiple UEs are simultaneously connected to the BS using the same preamble. The BS can embed the flag bit in the second message and transmit the second message to the UE.

According to the method illustrated in FIG. 4, the first message includes both the preamble and the resource request information. Accordingly, the UE can transmit data through the third message if the BS detects both the preamble and the resource request information from the first message, and thus a delay for data transmission can be reduced. Furthermore, a collision between third messages can be prevented even when multiple UEs select the same preamble because the error check code is included in the resource request information.

Figure 5:
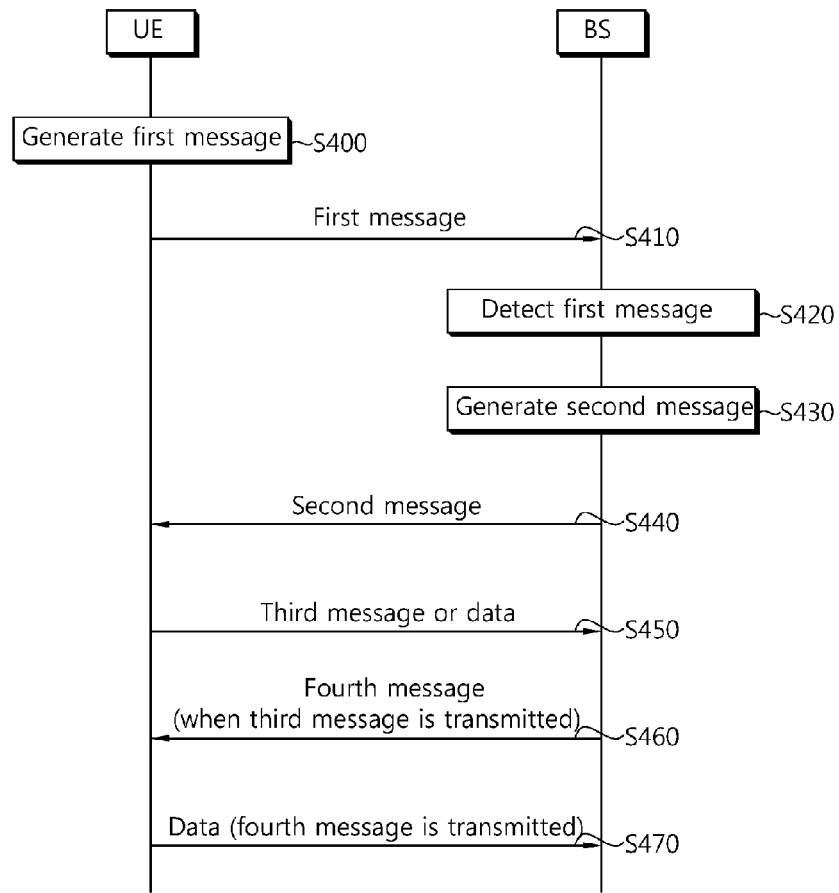
FIG. 5 is a flowchart illustrating an uplink resource allocation request method according to an embodiment of the present invention.

FIG. 5 is a flowchart illustrating an uplink resource allocation request method according to an embodiment of the present invention.

Referring to FIG. 5, a UE generates a first message for an uplink resource allocation request in consideration of a communication state between the UE and a BS (step S400). That is, the UE can determine whether the first message includes only a preamble or both the preamble and resource request information based on the communication state between the UE and the BS. For example, the UE can determine the contents of the first message in consideration of the signal-to-noise ratio (SNR) of the UE and the position of the UE. Furthermore, when the signal intensity measured through downlink is lower than the minimum signal intensity capable of successively detecting information, the UE can determine that channel state is poor and generate the first message including only the preamble. The UE can also determine the contents of the first message in consideration of the number of transmission failure of the first message. That is, if the number of transmission failure of the first message is more than a certain level, the UE can determine that channel state is poor and regenerate the first message including only the preamble.

The UE transmits the first message to the BS (step S410).

The BS receives the first message and detects the first message (step S420) and generates a second message based on the contents of the first message (step S430). That is, the BS generates the second message including first resource allocation information when detecting both the preamble and the resource request information from the first message. The BS generates the second message including second resource allocation information when detecting only the preamble from the first message. Here, the BS detects only the preamble when the UE transmits the first message including only the preamble in step S410 and when the BS does not detect the resource request information due to a poor channel receiving environment although the UE transmits the first message including both the preamble and the resource request information in step S410.

The BS transmits the second message to the UE (step S440).

The UE receives the second message, and transmits a third message to the BS (step S450). When the second message includes the first resource allocation information, the third message includes data to be transmitted from the UE to the BS. Accordingly, data transmission is completed. If the second message includes the second resource allocation information, the third message includes resource request information.

The BS receives the third message including the resource request information, and transmits a fourth message to the UE (step S460). The fourth message includes the first resource allocation information corresponding to resource allocation information for data transmission.

The UE receives the fourth message and transmits data to the BS to thereby complete data transmission (step S470).

According to the method illustrated in FIG. 5, a delay for data transmission can be reduced if the first message includes both the preamble and the resource request information and the BS detects both the preamble and the resource request information from the first message. Furthermore, the UE transmits only the preamble in a poor communication state, and thus resource allocation efficiency can be improved.

In the embodiments shown in FIGS. 4 and 5, when the UE transmits the first message including the resource request information, the UE can spread the resource request information with a specific spreading code. When the resource request information is spread with the spreading code, the BS can easily detect the resource request information. The specific spreading code is determined according to the preamble included in the first message. That is, the specific spreading code for spreading the resource request information is determined by the UE and the BS cannot detect the resource request information if the BS does not know the spreading code by which the resource request information is spread. Accordingly, the BS can be easily aware of the spreading code by which the resource request information is spread if there is a predetermined relation between the preamble included in the first message and the spreading code. When there are ten selectable preambles and two spreading codes, for example, and if it is agreed that a UE that selects odd-numbered preambles spreads resource request information by using the first spreading code and a UE that selects even-numbered preambles spreads resource request information by using the second spreading code, the BS can be aware of the spreading codes and easily detect the resource request information.

In addition, the BS can determine whether the first message includes only the preamble or both the preamble and the resource request information and notify the UE of the determination result. The BS can determine the contents of the first message based on the communication state between the UE and the BS. Here, the communication state between the UE and the BS can be determined in consideration of at least one of information on the number of receiving antennas of the BS, information on uplink load and information on the number of transmission failure of the first message. Furthermore, the time and frequency at which the first message is transmitted can be set based on whether the first message includes only the preamble or both the preamble and the resource request information, and the preamble included in the first message can be respectively set from different preamble sets. For example, the BS may embed information on whether the UE transmits the first message including the resource request information (i.e., the first message type), information on the time and frequency resource at which the corresponding first message type is transmitted, and information on a preamble set from which a preamble to be used for the corresponding first message type is selected in first message guide information and transmit the first message guide information to the UE.

Figure 6:
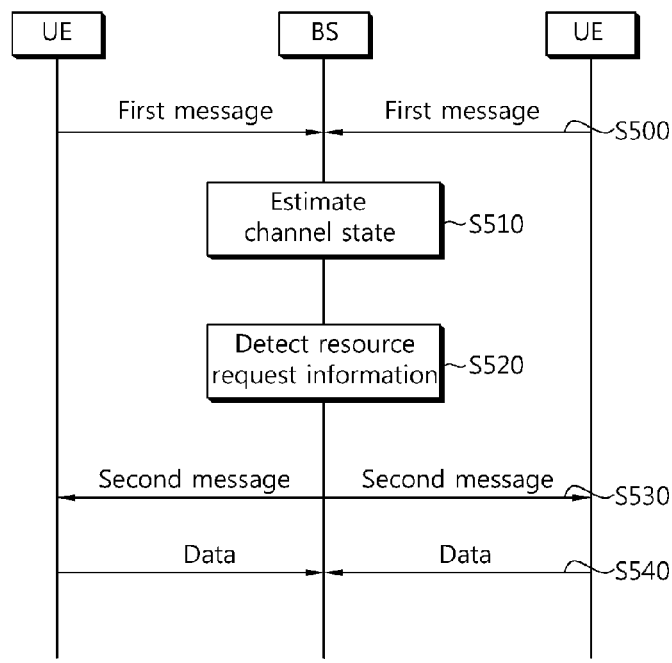
FIG. 6 is a flowchart illustrating an uplink resource allocation method according to an embodiment of the present invention when a plurality of user equipments are connected to a base station using multiple antennas.

FIG. 6 is a flowchart illustrating an uplink resource allocation method according to an embodiment of the present invention when a plurality of UEs are connected to a BS using multiple antennas.

The plurality of UEs respectively transmits a plurality of first messages including preambles and resource request information to the BS (step S500). Here, the resource request information may include MAC addresses of the UEs, the correct quantity of resources required for data transmission and an error check code such as head checksum.

The BS receives the plurality of first messages and estimates channel states between the UEs and the BS (step S510). Here, the BS can estimate the channel states by using the preambles received through the plurality of first messages from the multiple UEs and the multiple antennas.

The BS detects the resource request information transmitted from the UEs by using the estimated channel states and a multi-user detector (step S520). For instance, the multi-user detector may use a matched filter, zero forcing, minimum mean squared error, successive interference cancellation, etc. In addition, if the resource request information is spread with progression, the BS can detect the resource request information of the UEs simultaneously connected to the BS more easily.

When the BS detects a plurality of resource request information signals, the BS generates a plurality of second messages including resource allocation information for data transmission in response to the plurality of resource request information signals and respectively transmits the second messages to the UEs (step S530).

According to the method illustrated in FIG. 6, the BS using the multiple antennas easily detects the plurality of resource request information signals received from the plurality of UEs. Accordingly, the plurality of UEs can simultaneously transmit data, and thus channel capacity increases.

Figure 7:
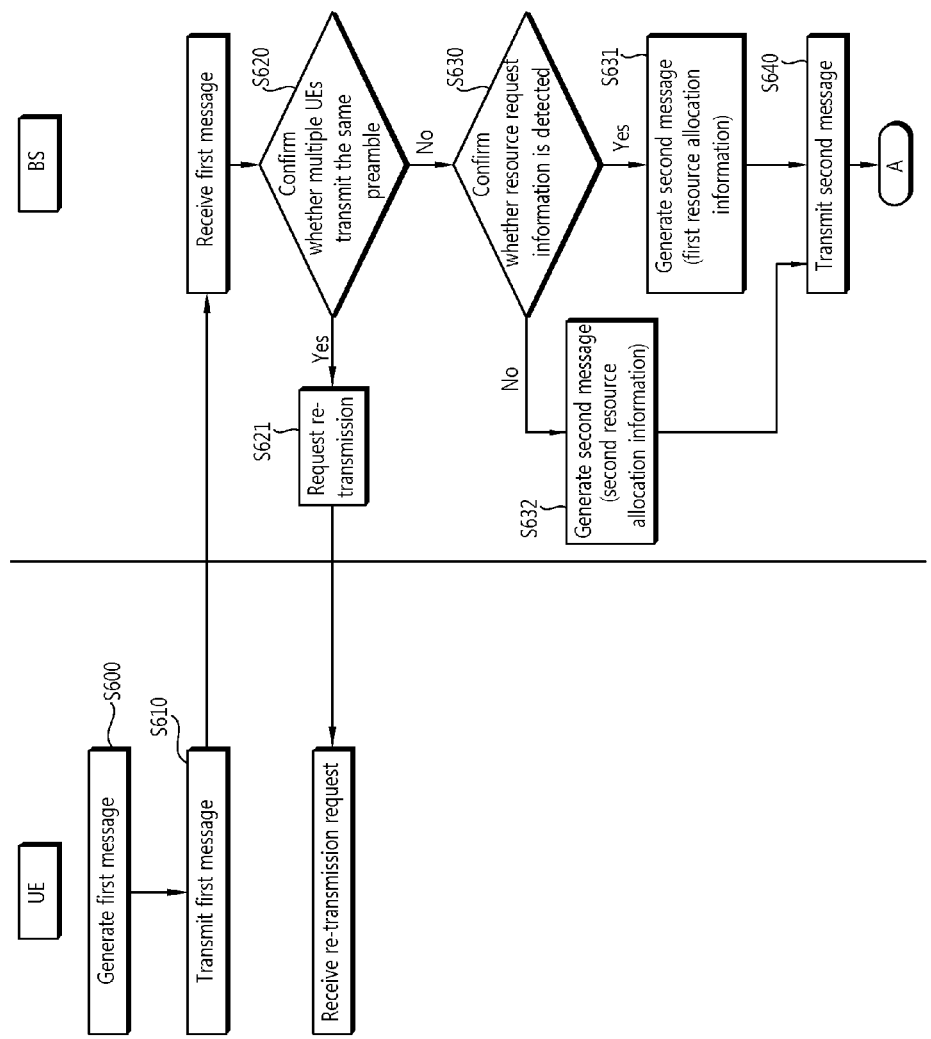
FIGS. 7 and 8 are flowcharts illustrating an uplink resource allocation method according to an embodiment of the present invention.
Figure 8:
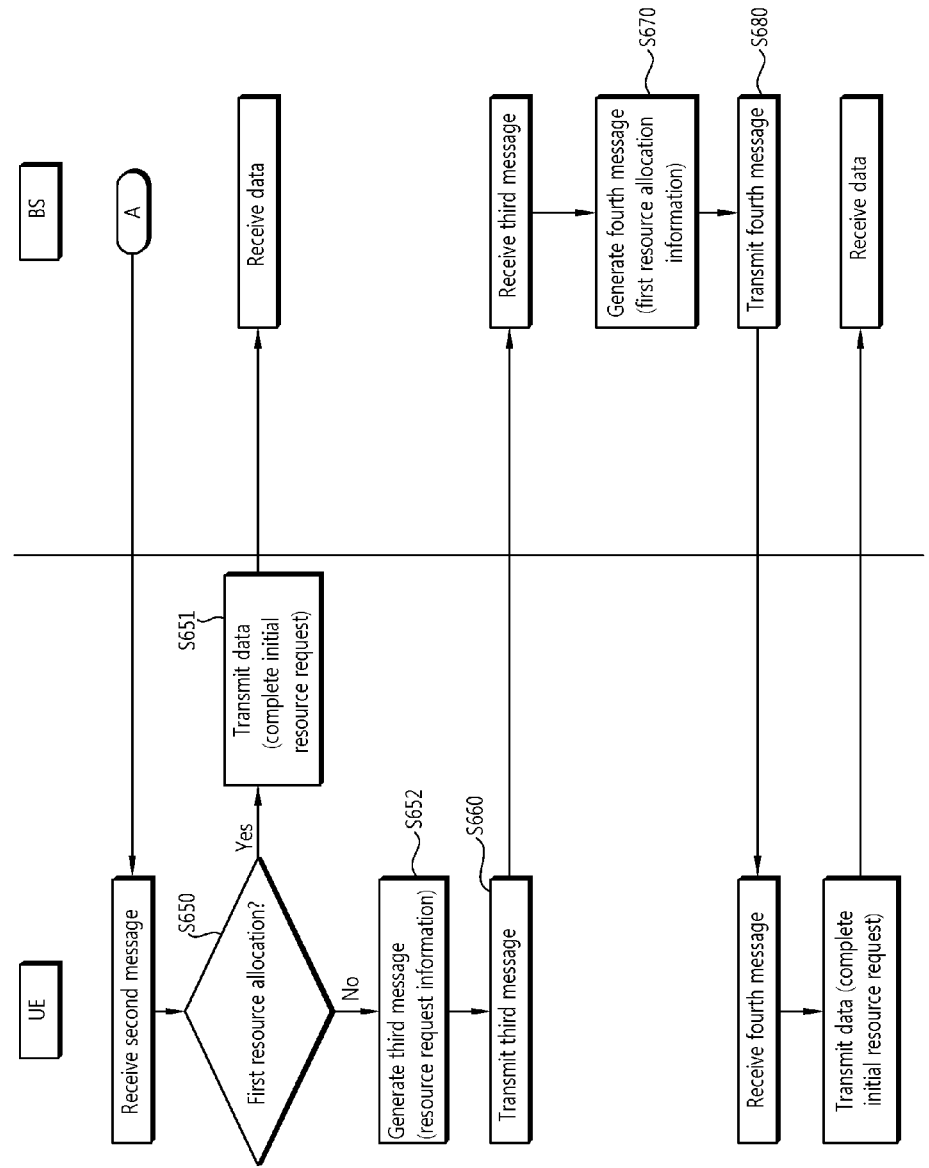

FIGS. 7 and 8 are flowcharts illustrating an uplink resource allocation method according to an embodiment of the present invention.

Referring to FIGS. 7 and 8, a UE having data to be transmitted through uplink generates a first message to be transmitted to a BS (step S600). Here, the first message includes a preamble arbitrarily selected by the UE. The UE adds resource request information to the first message when communication state is satisfactory. The resource request information may include the MAC address of the UE, the correct quantity of resources required for transmitting data and an error check code such as head checksum. The communication state may be determined in consideration of information on the quality of a channel between the UE and the BS, the position of the UE, the strength of a downlink received signal and the number of transmission failure of the first message.

The UE transmits the first message to the BS (step S610).

The BS receives the first message and confirms whether a plurality of UEs transmit the same preamble (step S620). When the BS determines that the plurality of UEs transmit the same preamble, the BS request the UE to re-transmit the first message (step S621).

When the BS determines that the plurality of UEs do not transmit the same preamble, the BS detects the preamble and the resource request information of the first message (step S630). When the BS detects both the preamble and the resource request information, the BS generates a second message including resource allocation information (referred to as a first resource allocation information hereinafter) for data transmission (step S631). When the BS detects only the preamble, the BS generates a second message including resource allocation information (referred to as a second resource allocation information hereinafter) for transmitting the resource request information (step S632).

The BS transmits the second message to the UE (step S640).

The UE receives the second message and confirms the resource allocation information included in the second message (step S650). If the confirmed resource allocation corresponds to the first resource allocation information, the UE transmits data and completes initial resource request (step S651). If the confirmed resource allocation corresponds to the second resource allocation information, the UE generates a third message (step S652). Here, the third message includes resource request information which includes the MAC address of the UE, the correct quantity of resources required for transmitting data and an error check code.

The UE transmits the third message to the BS by using the resource allocation information included in the second message (step S660).

The BS receives the third message and generates a fourth message including the first resource allocation information (step S670). Here, the first resource allocation information may be generated with reference to the resource request information included in the third message.

The BS transmits the fourth message to the UE (step S680). The UE receives the fourth message and transmits data to the BS by using the first resource allocation information (step S690) and ends initial resource request.

According to the embodiment illustrated in FIGS. 7 and 8, a delay required for data transmission can be reduced by adaptively controlling the uplink resource request and resource allocation method.

Figure 9:
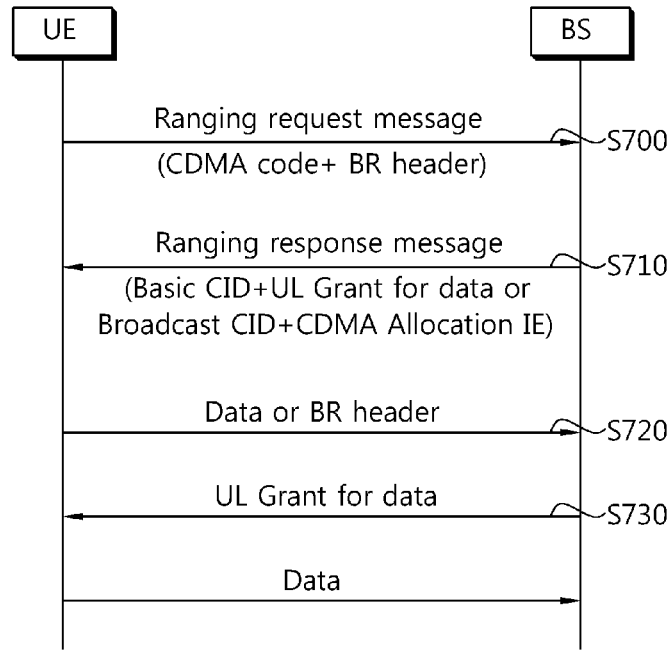
FIG. 9 is a flowchart illustrating an uplink resource allocation request method according to an embodiment of the present invention.

FIG. 9 is a flowchart illustrating an uplink resource allocation request method according to an embodiment of the present invention.

Referring to FIG. 9, a UE transmits a ranging request message to a BS (step S700). The ranging request message may include a CDMA code and a resource request header. The UE may generate the ranging request message including both the CDMA code and the resource request header when communication state is satisfactory and generate the ranging request message including only the CDMA code when the communication state is poor.

The CDMA code may be arbitrarily selected from a series of allowed codes and use PRBS (Pseudo-Random Bit Sequence) and BPSK (Binary Phase Shift Keying) codes. The resource request header may be a bandwidth request header. Table 1 represents an example of bandwidth request header field.

TABLE 1

| Name | Length (bit) | Description |
|---|---|---|
| BR | 19 | Bandwidth request. The number of bytes of UL bandwidth requested by the SS. The BR is for the CID. The request shall bel independent of the physical layer modulation and coding. |
| CID | 16 | Connection Identifier |
| EC | 1 | Always set to Zero |
| HCS | 8 | Header Check Sequence |
| HT | 1 | Header Type |
| Type | 3 | Indicates the types of BR header |

The BS receives the ranging request message and transmits a ranging response message to the UE (step S710). The ranging response message informs the UE that the BS has successively received the CDMA code.

The BS transmits the ranging response message including the basic CID of the UE and resource allocation information for data transmission to the UE when the BS detects both the CDMA code and the resource request header from the ranging request message. The BS transmits the ranging response message including a broadcast CID and a CDMA allocation information element (IE) to the UE when the BS detects only the CDMA code from the ranging request message.

The UE receives the ranging response message and transmits data or a message including the resource request header to the BS (step S720). If the ranging response message includes the basic CID and the resource allocation information for data transmission, the UE transmits the data based on the resource allocation information. If the ranging response message includes the broadcast CID and the CDMA allocation IE, the UE transmits the message including the resource request header, for example, the bandwidth request header represented in Table 1.

When the BS receives the message including the resource request header, the BS transmits a message including the resource allocation information for data transmission to the UE (step S730). The UE receives the message including the resource allocation information and transmits data by using the resource allocation information.

According to the method illustrated in FIG. 9, a delay for data transmission can be reduced by adaptively controlling the uplink resource allocation method.

Figure 10:
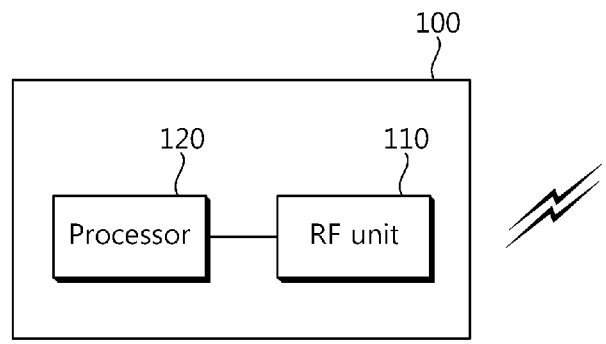
FIG. 10 is a block diagram illustrating a user equipment according to an embodiment of the present invention.

FIG. 10 is a block diagram illustrating a user equipment according to an embodiment of the present invention.

Referring to FIG. 10, a user equipment (100) comprises a RF (Radio Frequency) unit (110) and a processor (120). The RF unit (110) is connected to the processor (120). The RF unit (110) transmits and receives a radio signal. The processor (120) is configured to generate a first message which has a preamble and adaptively further includes resource request information based on a communication state with a base station and transmit the first message to the base station.

The prevent invention can be embodied as hardware, software or combination thereof. When the invention is embodied as hardware, the invention can be implemented in ASIC (Application Specific Integrated Circuit), DSP (Digital Signal Processing), PLD (Programmable Logic Device), FPGA (Field Programmable Gate Array), processor, controller, microprocessor, other electronic units or combinations thereof, which are designed to perform the aforementioned functions. When the invention is embodied as software, the invention can be implemented in a module performing the aforementioned functions. Software can be stored in a memory unit and executed by a processor. The memory unit or the processor can employ various means well-known to those skilled in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of allocating uplink resources in a wireless communication system, the method comprising:
   generating a first message which includes a preamble and adaptively further includes resource request information based on a communication state with a base station;
   transmitting the first message to the base station,
   wherein the resource request information includes at least one of a MAC (Medium Access Control) address of the user equipment transmitting the first message, information on the quantity of requested resources, and an error check code; and
   receiving a second message which includes either:
     resource allocation information for data transmission when the first message includes both the preamble and the resource request information, or
     resource allocation information for transmitting the resource request information when the first message includes only the preamble.

2. The method of claim 1, wherein the communication state is determined in consideration of at least one of information on a channel quality between the base station and a user equipment transmitting the first message, information on a position, information on a strength of a downlink received signal and information on the number of transmission failure of the first message.

3. The method of claim 1, further comprising transmitting a third message which includes data when the second message includes the resource allocation information for data transmission and includes resource request information when the second message includes the resource allocation information for transmitting the resource request information.

4. The method of claim 1, wherein the resource request information is spread with a spreading code and transmitted when the first message includes the resource request information.

5. A user equipment comprising:
   a processor; and
   a RF (Radio Frequency) unit which is connected to the processor and transmits/receives a radio signal,
   wherein the processor is configured to generate a first message which includes a preamble and adaptively further includes resource request information based on a communication state with a base station and transmit the first message to the base station through the RF unit,
   wherein the resource request information includes at least one of a MAC (Medium Access Control) address of the user equipment transmitting the first message, information on the quantity of requested resources, and an error check code, and the processor is configured to receive, through the RF unit, a second message including either:
resource allocation information for data transmission when the first message includes both the preamble and the resource request information, or
resource allocation information for transmitting the resource request information when the first message includes only the preamble.

6. A method of allocating uplink resources in a wireless communication system, the method comprising:
receiving a first message including a preamble and resource request information from a user equipment;
detecting the first message and adaptively generating a second message based on whether the resource request information is detected from the first message; and
transmitting the second message to the user equipment,
wherein the resource request information includes at least one of a MAC (Medium Access Control) address of the user equipment, a quantity of requested resources, and an error check code, and
wherein the second message includes either:
resource allocation information for data transmission when the resource request information is detected from the first message, or
resource allocation information for transmitting the resource request information when the resource request information is not detected from the first message.

7. The method of claim 6, further comprising receiving a third message which includes data when the second message includes the resource allocation information for data transmission and includes the resource request information when the second message includes the resource allocation information for transmitting the resource request information.

8. A method of allocating uplink resources of a base station using multiple antennas in a wireless communication system, the method comprising:
receiving a plurality of first messages including preambles and resource request information from a plurality of user equipment;
estimating channel states between the plurality of user equipment and the base station by using the plurality of first messages;
detecting the resource request information by using the estimated channel states and a multi-user detector;
generating a plurality of second messages respectively including resource allocation information for data transmission for the plurality of user equipment based on the detected resource request information; and
respectively transmitting the second messages to the plurality of user equipment, each of the second messages including either:
resource allocation information for data transmission when each of the resource request information is detected from each of the first messages, or
resource allocation information for transmitting the resource request information when the resource request information is not detected from each of the first messages.

9. A method of allocating uplink resources of a base station in a wireless communication system, the method comprising:
setting first message guide information and transmitting the first message guide information to a user equipment;
receiving a first message generated based on the first message guide information, the first message guide information being set such that the first message includes a preamble and adaptively further includes resource request information based on a communication state between the base station and the user equipment; and
transmitting the second message to the user equipment, the second message including either:
resource allocation information for data transmission when the resource request information is detected from the first message, or
resource allocation information for transmitting the resource request information when the resource request information is not detected from the first message.

10. The method of claim 9, wherein the communication state is determined in consideration of at least one of information on the number of receiving antennas of the base station and information on uplink load.

11. The method of claim 9, wherein the first message guide information sets the time or frequency at which the first message is transmitted based on whether the first message includes the resource request information.

12. The method of claim 9, wherein the first message guide information sets the first message such that the preamble included in the first message is selected from different preamble sets based on whether the first message includes the resource request information.

* * * * *